Feb. 9, 1965 L. J. SIEGHARTNER 3,168,869
SEALING MEANS
Filed Aug. 27, 1963 2 Sheets-Sheet 1

INVENTOR.
Leonard J. Sieghartner,
BY
Brown, Jackson, Boettcher & Dienner
Attys

Feb. 9, 1965 L. J. SIEGHARTNER 3,168,869
SEALING MEANS
Filed Aug. 27, 1963 2 Sheets-Sheet 2

INVENTOR.
Leonard J. Sieghartner,
BY
Braun, Jackson, Critello & Dienner
Attys.

United States Patent Office 3,168,869
Patented Feb. 9, 1965

1

3,168,869
SEALING MEANS
Leonard J. Sieghartner, Coal Valley, Ill., assignor to Roy E. Roth Company, Rock Island, Ill., a corporation of Illinois
Filed Aug. 27, 1963, Ser. No. 304,781
7 Claims. (Cl. 103—96)

This invention relates, in general, to sealing means, and has particular relation to an improved seal for shafts which are movably mounted and surrounded by a stuffing box containing packing for sealing against leakage and a gland member for retaining pressure.

Heretofore, it has been the practice, for example, in pumps having a pump cavity and a rotatable pump shaft provided with an impeller thereon for rotation within the pump cavity, to surround the shaft with a stuffing box having packing therein for sealing the pump against leakage from the pump cavity. In prior practice the bore of the stuffing box has been smooth and as a result the pressure in the pump cavity to which the inner end of the packing is exposed pushes the packing back out of the stuffing box and against a gland member at its outer end. The smooth bore stuffing box thus concentrates the sealing pressure close to the gland member with consequent heating and scoring of the shaft. This has been especially true with packings having relatively low coefficients of friction such as braided Teflon filament.

One of the main objects of the present invention is to provide, in combination, a pump casing having a pump cavity, a rotatable pump shaft having an impeller fixed thereon for rotation within said pump cavity and creating pressure in said cavity, a stuffing box surrounding said shaft and having a bore with packing therein for sealing the pump against leakage from said pump cavity, said packing being exposed at its inner end to the pressure within said pump cavity, a gland member having a smooth externally cylindrical portion entering the outer end of said bore and slidable longitudinally in said bore without rotation to compress said packing, and grooves in the bore of said stuffing box coacting with said packing, said grooves having sides facing the impeller and disposed substantially at right angles to the axis of said shaft and sides facing said gland member sloping at an angle of not more than 45° to the axis of the shaft.

Another object is to provide in the foregoing combination a gland member wherein the inner end of the externally cylindrical portion thereof has an outwardly sloping face cooperating with the packing for deconcentrating the packing pressure away from the immediate area.

Another object is to provide in the foregoing combination an impeller which rotates between liners having sealing surfaces cooperating with opposite sides of the impeller, the impeller having blades operating in a pressure developing channel outwardly of the sealing surfaces, and the packing at its impeller end being exposed to pressure developed in said pressure developing channel passing inwardly along at least one of the sealing surfaces.

Another object is to provide in the foregoing combination packing having a relatively low coefficient of friction.

Another object is to provide in the foregoing combination grooves of the character set forth in the bore of the stuffing box which grooves are of annular form.

Another object is to avoid concentrating the sealing pressure close to the gland member thus eliminating or reducing heating and scoring of the shaft.

Further features and numerous advantages and adaptations of the invention will be apparent from the following detailed description taken in connection with the accompanying drawings, it being understood that the invention is limited only within the scope of the appended claims and not to the particular embodiment selected for illustration.

Figure 1:
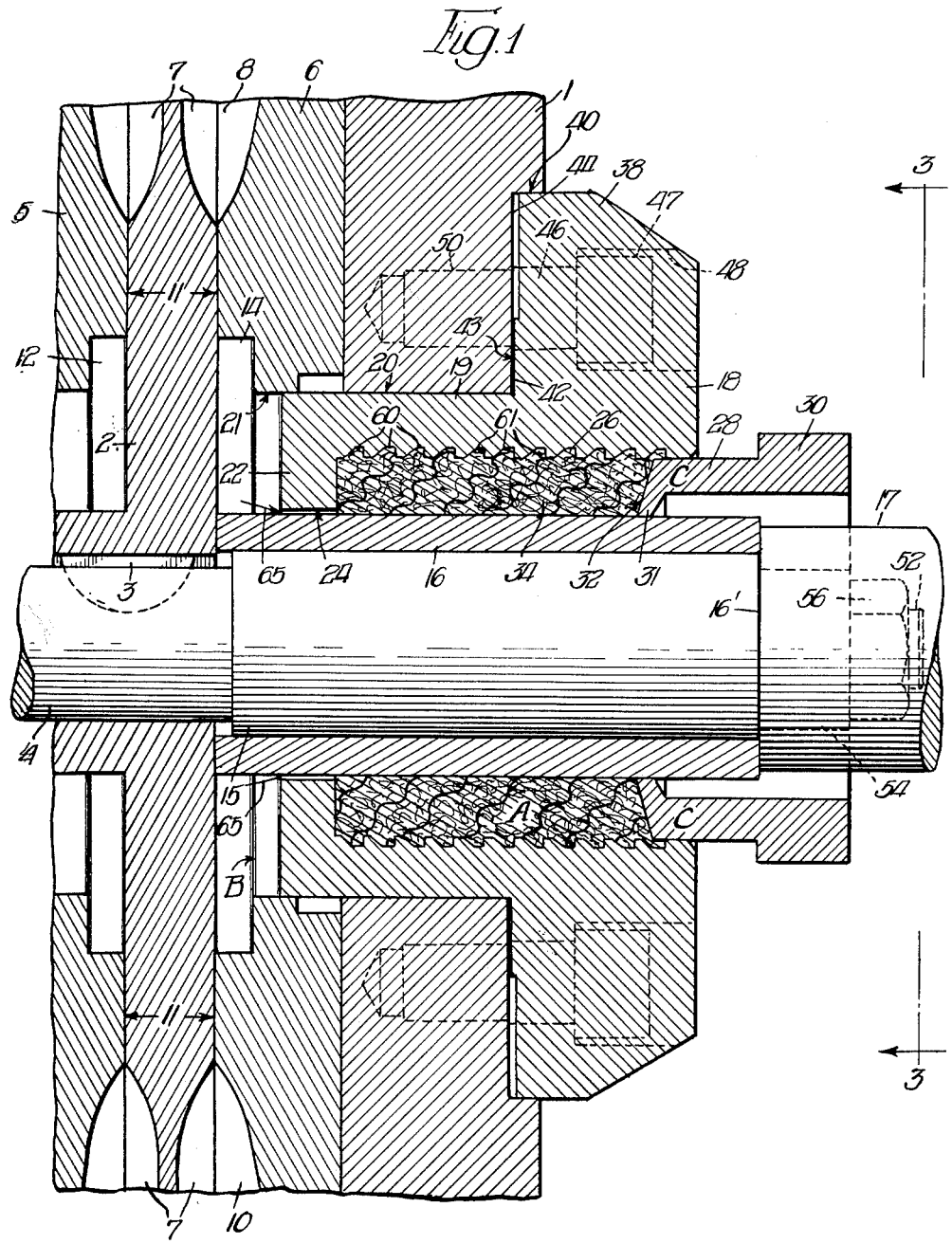
FIGURE 1 is a fragmentary sectional view showing sealing means according to the present invention for preventing pressure in the pump cavity of a pump from unduly pushing the packing outwardly in the stuffing box and against the gland member.
Figure 2:
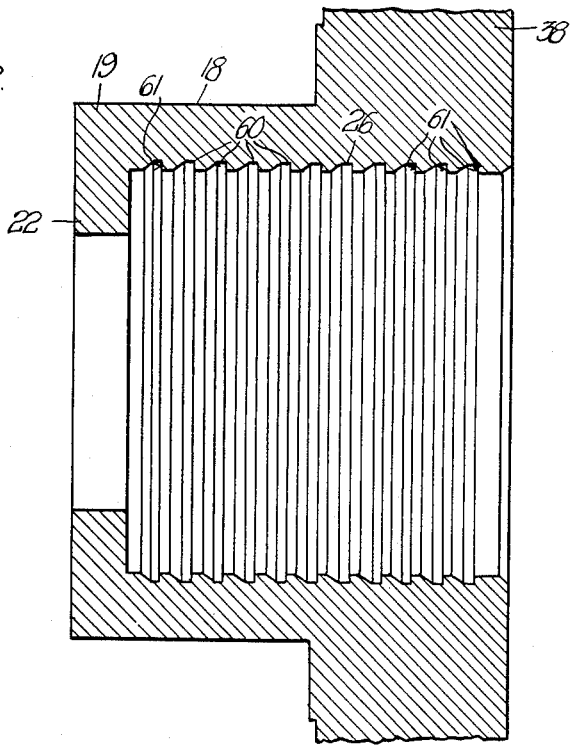
FIGURE 2 is a diametrical sectional view through the stuffing box and showing one suitable form of serrations in the bore thereof.
Figure 3:
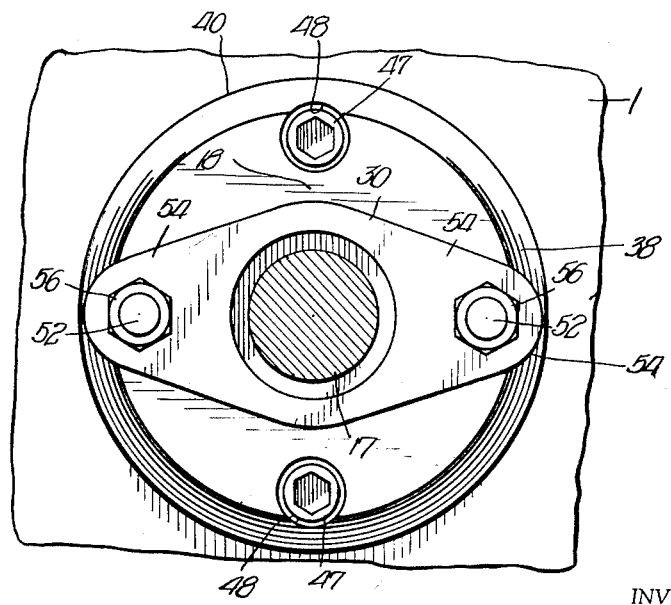
FIGURE 3 is an outer end view of the stuffing box and gland member taken sectionally through the pump shaft along the line 3—3 of FIGURE 1.

Referring to the drawings for a detailed description, the pump shown fragmentarily in FIGURE 1 has a casing designated by the numeral 1.

An impeller 2 is fixed by a Woodruff key or spline 3 to rotate with the pump shaft 4. The impeller 2 rotates within the casing 1 between liners 5 and 6. The impeller 2 has vanes or blades 7 opening from opposite sides and peripherally from the impeller 2 and operable within, for example, a liquid channel 8.

In the operation of the pump, liquid under pressure in the pressure developing channel 10 will pass inwardly along the sealing surfaces 11 to pump cavities 12 and 14. The pump shaft 4 is enlarged at 15 and a sleeve 16 surrounds this portion 15 of the pump shaft 4 and is positioned endwise between the impeller 2 at its inner end and a shoulder 16' provided by further enlargement 17 of the shaft at its outer end.

A stuffing box 18 has a cylindrical portion 19 which passes through an opening 20 in the casing 1 and into an opening 21 in the liner 6. The stuffing box 18 has an inwardly extending annular flange 22 at its inner end. The inner periphery of the flange 22 surrounds the sleeve 16 with a space or clearance at 24 between the inner periphery of the flange 22 and the sleeve 16.

The annular bore 26 of the stuffing box 18 is spaced radially outwardly from the outer periphery of the sleeve 16. The cylindrical portion 28 of a gland member 30 enters the outer end of the bore 26 and has an annular flange 31 presented at its inner end to the outer periphery of the sleeve 16. The inner end of the gland member 30 is tapered at 32 and suitable packing 34 is disposed within the bore 26 of the stuffing box 18 and about the sleeve 16; also endwise between the flange 22 and the inner end 32 of the gland member 30. The tapered or outwardly sloping face 32 of the gland member 30 is used to deconcentrate the packing pressure away from the immediate area. The packing 34 may have a low coefficient of friction such as afforded by braided Teflon filament, or may be of other forms within the broader aspects of the present invention.

At its outer end the stuffing box 18 has an annular flange 38 the outer periphery of which is positioned in an opening 40 in the casing 1. A gasket 42 is positioned between the inner side of the flange 38 and the surface 43 of the casing 1. Outwardly of the gasket 42 the inner side of the flange 38 is spaced from the casing surface 43 at 44. The stuffing box 18 is secured to the casing 1 by screws 46. The heads 47 of the screws 46 enter openings 48 in the flange 38 and the shanks of the screws 46 are screwed into the casing 1 at 50.

Fixed at their inner end, for example, in the stuffing box 18 are screws 52 which pass outwardly through openings in lugs 54 on the outer end of the gland member 30. Nuts 56 screwed on the outer ends of the screws 52 and coacting inwardly with the lugs 54 provide for adjusting the gland member 30 inwardly to compress the packing 34 between the flange 22 and the inner end 32 of the gland member 30 and between the bore 26 of the stuffing box and the sleeve 16.

The bore 26 of the stuffing box 18 has annular grooves 60 which provide inwardly pointing serrations or projections 61. These inwardly pointing serrations or projections engage and hold the packing and prevent the pressure in the pump cavity 14 through the space or clearance at 24 as indicated by the arrows 65 in FIGURE 1 from pushing the packing 34 back out of the stuffing box 18 and against the gland member 30. Heretofore with stuffing boxes having smooth bores the sealing pressure has been concentrated close to the gland member 30 with consequent heating and scoring of the shaft. This has been especially true with packings having low coefficients of friction such as braided Teflon filament.

With the present invention a more uniform sealing pressure along the length of the packing is provided than with a stuffing box having a smooth bore. The sealing pressure is not concentrated close to the gland member and heating and scoring of the shaft are avoided.

The inwardly pointing serrations or projections 61 formed by the annular grooves 60 as shown in the drawings have been found to overcome the problem presented with stuffing boxes having smooth bores. Other forms of serrations are contemplated within the scope of the broader aspects of the present invention. In fact, it is new with applicant to provide a stuffing box having means associated therewith for preventing pressure at one end of the packing from unduly pushing the packing outwardly within the stuffing box and the broader of the appended claims have been drawn accordingly.

The improved form of seal of the present invention may be applied to any shaft movably mounted and surrounded by a stuffing box and gland member to retain pressure. With the grooves 60 a form tool may be used to make all of the grooves at one time.

The embodiment of the invention disclosed in the drawings and the specification is for illustrative purposes only and it is to be expressly understood that said drawings and the specification are not to be construed as a definition of the limits or scope of the invention, reference being had to the appended claims for that purpose.

I claim:

1. In combination, a pump casing having a pump cavity, a rotatable pump shaft having an impeller fixed thereon for rotation within said pump cavity and creating a pressure in said cavity, a sleeve surrounding said pump shaft and positioned endwise between said impeller and a shoulder on said pump shaft, a stuffing box surrounding said sleeve and passing through an opening in said pump casing and having at its inner end an inwardly extending annular flange with clearance between the inner periphery of said flange and said sleeve, screw means securing said stuffing box to said pump casing, said stuffing box having an annular bore spaced radially outwardly from said sleeve, a gland member having a smooth externally cylindrical portion entering the outer end of said bore and slidable longitudinally in said bore without rotation toward and away from said annular flange, the bore of said stuffing box having grooves with the sides of the grooves facing the impeller substantially vertical to the axis of said shaft and with the sides of said grooves facing said gland member sloping at an angle of not more than 45° to the axis of the shaft, packing in said bore between said annular flange and the inner end of said gland member and within the bore of said stuffing box and about said sleeve and engaging the grooves in said bore, lug means on the outer end of said gland member extending outwardly of said cylindrical portion of said gland member, screws fixed in said stuffing box radially outwardly of said annular bore and passing through openings in said lug means, and nuts screwed on the outer ends of said screws and coacting with said lug means for adjusting the gland member inwardly without rotation to compress said packing between the inner end of said gland member and said flange.

2. The combination according to claim 1, wherein the inner end of the externally cylindrical portion of said gland member has an outwardly sloping face cooperating with said packing for deconcentrating the packing pressure away from the immediate area.

3. The combination according to claim 1, wherein the grooves in the bore of the stuffing box are of annular form.

4. In a turbine pump, a pump casing having a pump cavity and an opening, a rotatable pump shaft having a turbine impeller fixed thereon for rotation within said pump cavity and creating a pressure in said cavity, a one piece stuffing box surrounding said shaft and having a smooth externally cylindrical portion entering the opening in said pump casing, said stuffing box having a bore therein with an inner wall extending radially inwardly on said stuffing box at the inner end of said bore, grooves extending throughout the full length of the bore of said stuffing box, said grooves having sides facing the impeller and disposed at substantially right angles to the axis of said shaft and sides facing away from said impeller and sloping at an angle of not more than 45° to the axis of said shaft, packing in the bore of said stuffing box cooperating with said grooves over the entire length of the bore of said stuffing box, a gland member having a smooth externally cylindrical portion entering the outer end of the bore of said stuffing box and cooperating with the inner periphery of said bore, screw means other than the grooves in the bore of said stuffing box for sliding said gland member longitudinally in said bore of said stuffing box without rotation to compress said packing, and an inner end surface at the inner end of said externally cylindrical portion of said gland member, said inner surface sloping outwardly away from said packing for deconcentrating the packing pressure away from the immediate area.

5. A turbine pump according to claim 4, wherein the grooves in the bore of the stuffing box are of annular form.

6. A turbine pump according to claim 4, including a sleeve surrounding the pump shaft and positioned endwise between the impeller and a shoulder on the pump shaft, the packing in the bore of said stuffing box surrounding said sleeve.

7. A turbine pump according to claim 4, said casing including liners on opposite sides of the impeller, said liners having sealing surfaces cooperating with opposite sides of the impeller, said impeller having blades operating in a pressure developing channel outwardly of said sealing surfaces, said packing at its impeller end being exposed to the pressure developed in said pressure developing channel passing inwardly along at least one of said sealing surfaces.

References Cited by the Examiner
UNITED STATES PATENTS

| | | | |
|---|---|---|---|
| 599,852 | 3/98 | Lufkin | 277—110 |
| 1,013,017 | 12/11 | Howarth | 277—123 |
| 1,578,851 | 3/26 | Samelson | 103—96 |
| 2,039,815 | 5/36 | Lupfer | 103—96 |
| 2,090,162 | 8/37 | Tighe | 103—111 |
| 2,364,168 | 12/44 | Shallenberg | 103—96 |
| 2,494,598 | 1/50 | Waring | 103—114 |
| 2,700,344 | 1/55 | Schellens | 103—112 |
| 2,745,687 | 5/56 | Stack | 277—110 |

JOSEPH H. BRANSON, Jr., *Primary Examiner.*

HENRY F. RADUAZO, *Examiner.*